(No Model.)
J. N. SARGENT.
DRAW BAND.
No. 381,426. Patented Apr. 17, 1888.
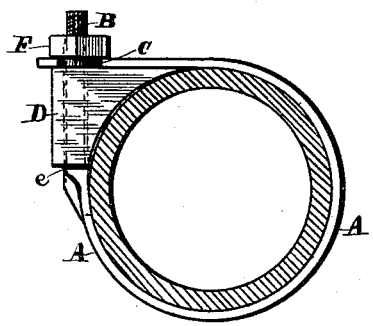
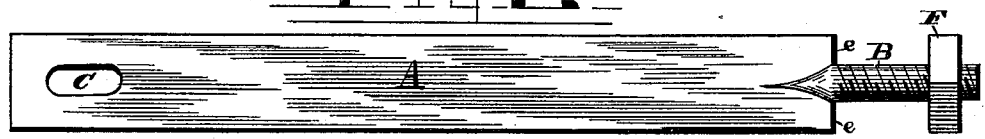
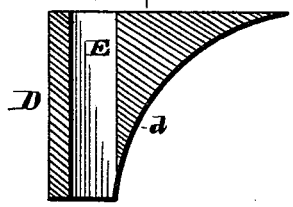
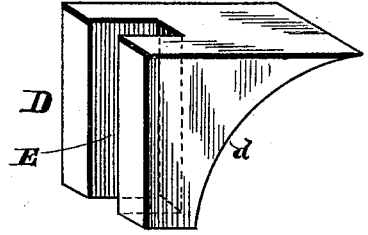
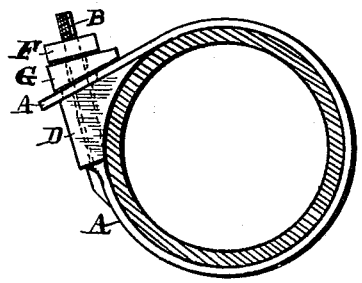
Witnesses.
A. E. Dowell
C. W. Seville
Inventor,
John N. Sargent
By His Attorney.
J. H. Alexander

UNITED STATES PATENT OFFICE.

JOHN N. SARGENT, OF AURORA, ASSIGNOR TO HIMSELF AND GILBERT H. WYMOND, OF DEARBORN COUNTY, INDIANA.

DRAW-BAND.

SPECIFICATION forming part of Letters Patent No. 381,426, dated April 17, 1888.

Application filed January 20, 1888. Serial No. 261,431. (No model.)

*To all whom it may concern:*

Be it known that I, JOHN N. SARGENT, of Aurora, in the county of Dearborn and State of Indiana, have invented certain new and useful Improvements in Draw-Bands; and I do hereby declare that the following is a full, clear, and exact description thereof, reference being had to the accompanying drawings, and to the letters of reference marked thereon, which form part of this specification, in which—

Figure 1 is a top view of my improved draw-band applied to a pipe. Fig. 2 is a view of the band opened. Fig. 3 is a sectional view of a clamp-washer. Fig. 4 is a modified form of the washer. Fig. 5 shows a modification of the band and washer.

This invention relates to improvements in draw or clamping bands, and its objects are to provide an adjustable band that will closely bind the object to which it is attached at every point; and it consists in the novel construction and arrangement of parts, hereinafter described, illustrated in the drawings, and particularly specified in the claims hereto appended.

Referring to the drawings by letter, A designates the band, made of strap metal, preferably, which has one of its ends reduced to a rod, B, and screw-threaded, as shown, and its other end is slotted, as shown at C, through which the end B is passed when the draw-band is used.

D indicates a washer corresponding in thickness to the width of band A and having a concaved face, *d*, which is turned inward to bind on the face of the pipe, as shown. This washer has a central bore, E, through it, by which it is hung upon end B of band A.

To apply the band to a pipe or cylinder, the band is bent around the same, washer D slipped on end B with its concave face inward and abuts against the shoulders *e*, formed at the junction of rod B with the body of the band. This end B is then slipped through the slot C in the opposite end of the band and a nut, F, placed on said end B and screwed home. The washer D then acts as a wedge to tighten the band and forms a close joint within said band at the point of fastening. This washer, owing to its peculiar form, acts as a wedge, and in connection with the screw-threads and nut enables a powerful compression to be given by the band, rendering the latter especially useful in clamping broken or split rods, bars, &c., and in assembling the parts of a sectional shaft or bar.

In Fig. 4, instead of making opening E of the washer closed on all sides, it is open at the rear, facilitating the placing or removal of the washer from end B, as is evident, whether the nut F be taken on the end B or not.

In Fig. 5 I have illustrated a slight modification of the washer D. In this the face of the washer against which the slotted end of the band rests is beveled, and a beveled washer, G, is placed on end B outside the slotted end of band A, so as to present a square bearing for nut F. This construction gives two oppositely-inclined wedge-surfaces beneath the nut and increases the compressing power of the band.

The band is especially useful as a hose-clamp for attaching the same to nozzles.

If desired, the concave washer D might be formed integral with band A or rigidly secured thereto, and I do not wish to limit myself to having the washer separate therefrom.

Having described my invention, what I claim as new, and desire to secure by Letters Patent, is—

1. The herein-described draw-band, composed of a strap having one reduced screw-threaded end and a slot in the other end, and adapted to be bent around the object to be clamped by passing its threaded end through its slotted end and securing the same by a nut, in combination with a block, D, having its inner face concaved to bear tightly against the object clamped and inserted between the ends of the strap and the object, substantially as and for the purpose described.

2. The combination of band A, having one end slotted and the other end reduced, shouldered, and screw-threaded, and a nut thereon, with a washer, D, concaved on its inner surface to fit snugly on the surface of the object to be clamped and placed on the threaded end of band A and forming the bearing of the nut below the slotted end of the band, substantially as and for the purpose described.

3. The combination of band A, having screw-threaded end B and slotted at its other end, with the concaved washer D, having bore E for the passage of the end B of the band, and a nut, F, on said end binding the slotted end of the strap against said washer, substantially as specified.

In testimony that I claim the foregoing as my own I affix my signature in presence of two witnesses.

JOHN N. SARGENT.

Witnesses:
MIRABEAU N. LYNN,
ROBERT T. McCLELLAN.